United States Patent [19]

Papandrea

[11] Patent Number: 4,849,100
[45] Date of Patent: Jul. 18, 1989

[54] PORTABLE WATER PURIFIER
[75] Inventor: Rocco A. Papandrea, Vandalia, Mich.
[73] Assignee: North American Aqua, Vandalia, Mich.
[21] Appl. No.: 837,513
[22] Filed: Mar. 7, 1986
[51] Int. Cl.[4] .................................................. C02F 1/32
[52] U.S. Cl. ...................................... 210/138; 210/192; 210/266
[58] Field of Search .................. 422/24; 210/192, 748, 210/266, 138

[56] References Cited

U.S. PATENT DOCUMENTS

| | | | |
|---|---|---|---|
| 1,965,947 | 7/1934 | Prouty | 422/24 X |
| 3,456,107 | 7/1969 | Robertson | 422/24 X |
| 3,471,693 | 10/1969 | Veloz | 422/24 X |
| 4,141,686 | 2/1979 | Lewis | 422/24 X |
| 4,204,956 | 5/1980 | Flatow | 422/24 X |

Primary Examiner—Tom Wyse
Attorney, Agent, or Firm—Todd A. Dawson

[57] ABSTRACT

A water purification system to provide uncontaminated, odorless water from a contaminated source implementing an ultraviolet chamber and sensor to ensure effective bacterial kill. A sensor shuts off water to user if ultraviolet light intensity falls below a safe minimum. A decalcification unit is provided to assure proper operation of the UV sensor.

3 Claims, 4 Drawing Sheets

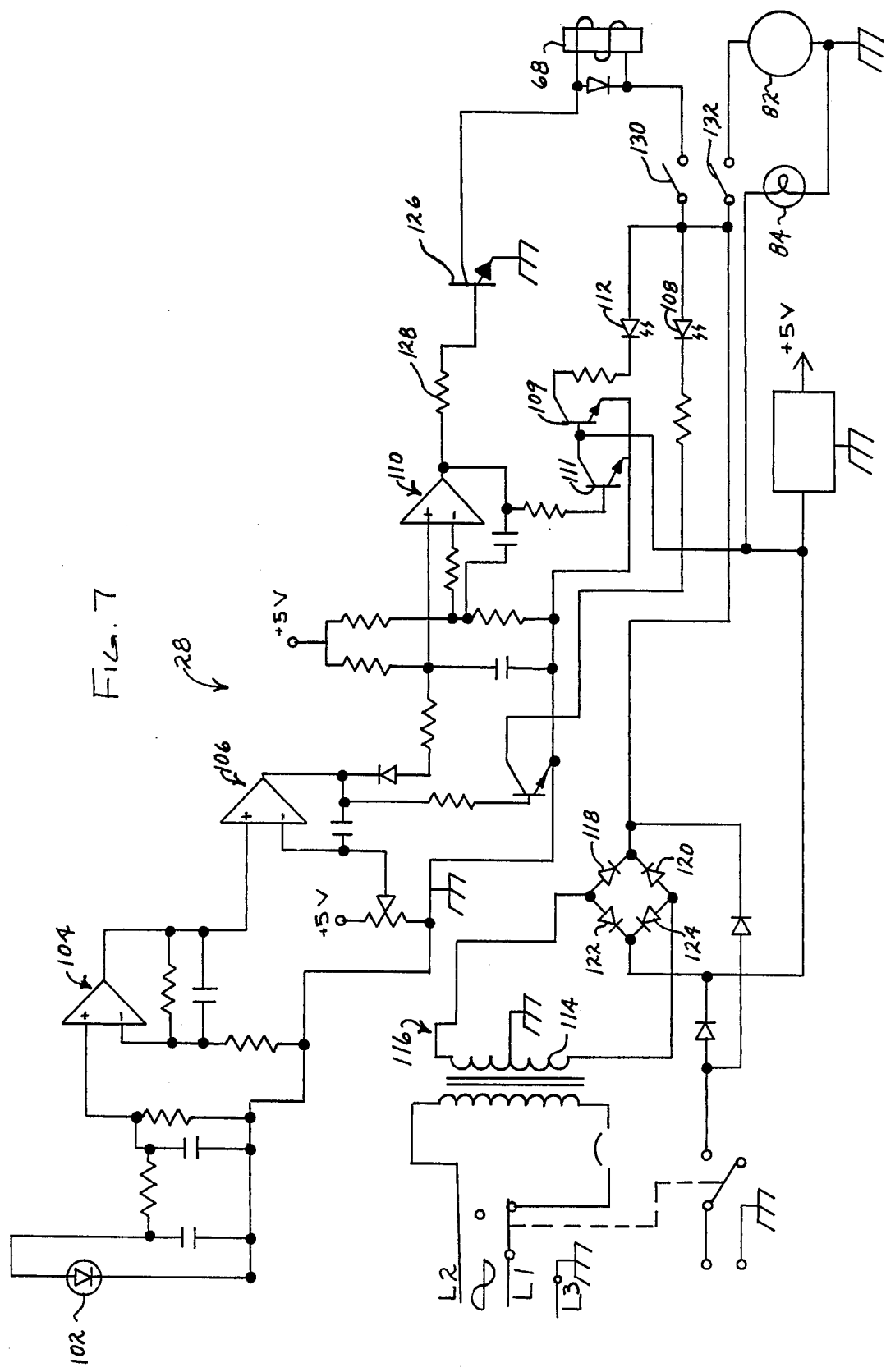

PORTABLE WATER PURIFIER

SUMMARY OF THE INVENTION

This invention relates to a water purification system and will have special application to a portable water purifier utilizing a brief case type housing to enclose a combination of filters and an ultraviolet (UV) chamber.

Prior water purifiers utilizing a brief case type housing require the housing to be open for filter operation. Problems associated with such purifiers include the exposure and possible contamination of its internal parts. Another problem associated with such prior art purifiers is the ineffectiveness of the UV chamber's monitoring system. Prior purifiers have utilized a photoelectric cell to detect only the presence of light not the effectiveness or amount of light within the chamber. Monitoring by photoelectric cells could allow the purifier to dispense water to the user that has not been properly decontaminated since the cell only monitors presence of light and not amount. Past purifiers have also experienced calcification problems which can cause the photoelectric cell to provide erroneous results.

The applicant's method of water purification eliminates the problems associated with prior purifiers by implementing a design which can remain closed during use and which utilizes a UV sensor circuit to measure the quantity of light within the UV chamber. Applicant has also placed a decalcification filter in line with the UV chamber to prevent calcium buildup.

Accordingly, it is an object of this invention to provide a water purification system that can be operated with its external case closed.

Another object of this invention is to provide for a water purification system implementing an ultraviolet light source.

Another object of this invention is to provide for a water purification system that monitors the intensity of the ultraviolet light source.

Another object of this invention is to provide a purification system capable of decontaminating water making it suitable for human consumption.

A further object of this invention is to provide a water purification system that is portable and can be powered by either an A.C. or D.C. source.

Other objects of this invention will become apparent upon a reading of the following description.

BRIEF DESCRIPTION OF THE DRAWINGS

FIG. 7 is a schematic representation of the electronic controls of the purifier.

DESCRIPTION OF THE PREFERRED EMBODIMENT

Figure 1:
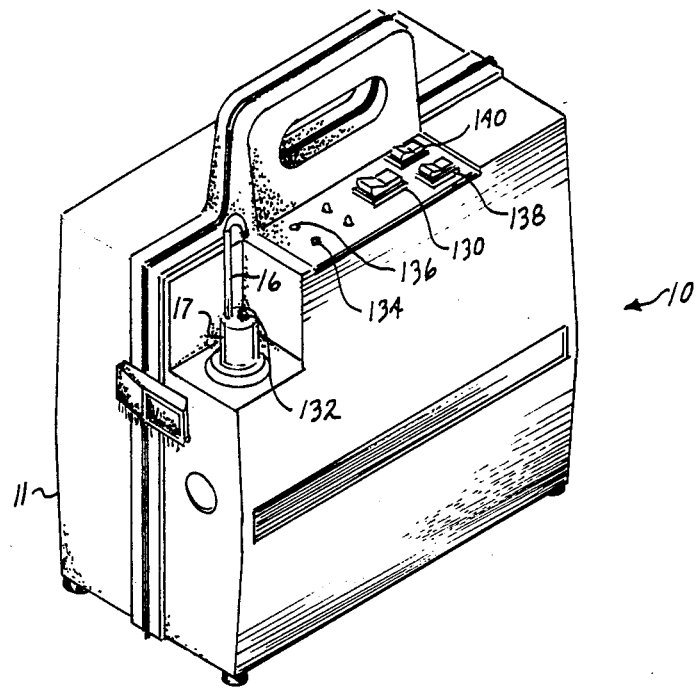
FIG. 1 is a perspective view of the purifier with its case closed and faucet attached.
Figure 2:
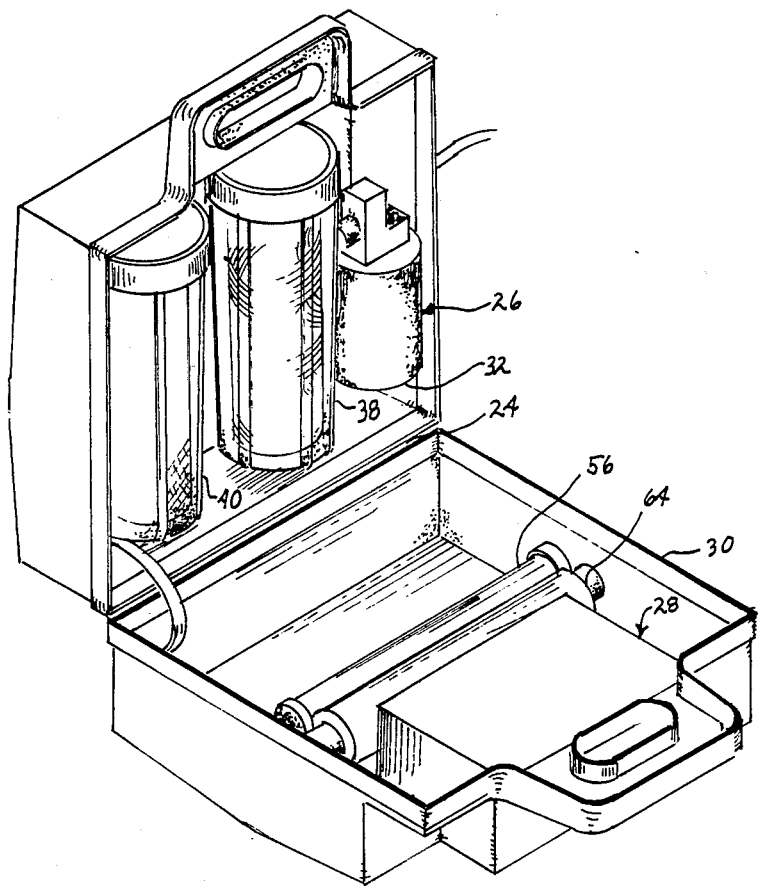
FIG. 2 is a perspective view of the open purifier with its case open to show its contents.

FIG. 1 shows the water purifier 10 in its closed position with faucet 16 and console 14 easily accessible to the user. FIG. 2 depicts purifier 10 with its case 11 opened about hinge 24 to reveal filtration unit 26 and electronic control unit 28. Case 11 has a rubber grommet 30 placed about its abutting half edges to promote a water tight and dirt-free chamber within case 11 when closed.

Figure 3:
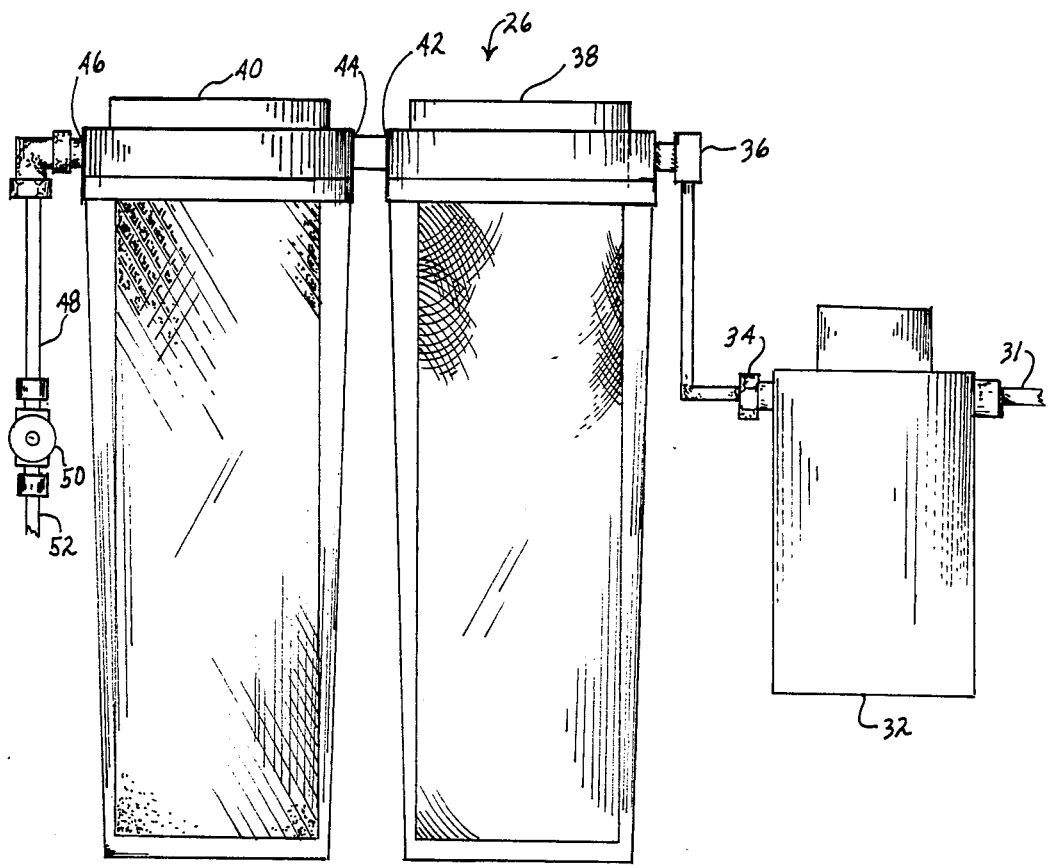
FIG. 3 is an elevational view of the filtering elements of the invention.

Filtration unit 26 shown in FIG. 3 includes a water pump 32 with its outlet 34 connected to inlet 36 of a filter 38. Filter 38 is connected in series to filter 40 with outlet 42 of filter 38 connected to inlet 44 of filter 40. Filter 38 is a prefiltration element used to remove sand, silt, sludge and other particulate matter. Filter element 40 houses polishing filtration element made of a solid block carbon element with a pore size of 0.5 microns to remove taste, odor, organic compounds and bacterium larger than 0.5 microns (i.e. cysts). Outlet 46 of filter 40 is connected via conduit 48 to flow regulator 50. Flow regulator 50 ensures a maximum of one-third gallon per minute flow to ultraviolet (UV) chamber 64. Maintaining this rate allows water inside UV chamber 64 to receive 30,000 microwatt seconds per square centimeter of UV light minimum which is a higher level of exposure than is needed to kill bacterium.

Figure 4:
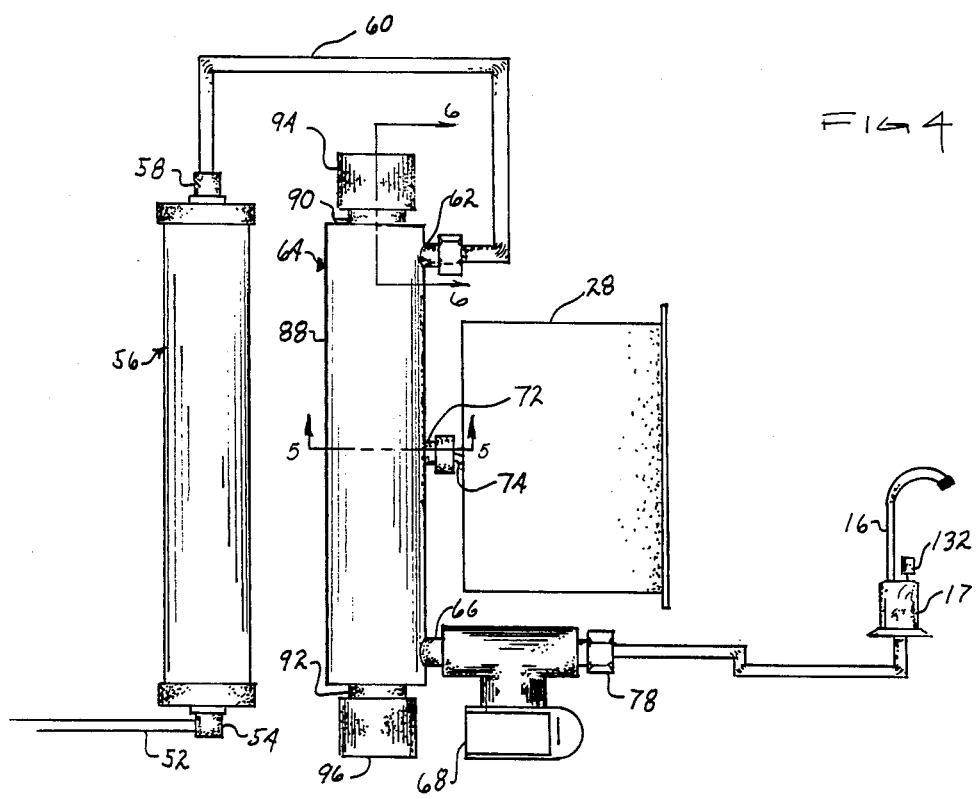
FIG. 4 is an elevational view of the decalcification element and ultraviolet chamber.

FIG. 4 shows conduit 52 coming from regulator 50 (see FIG. 3) and being connected to inlet 54 of a phosphate crystal filter 56. Crystal filter 56 used commonly in refrigeration units removes calcium from the water prior to entering the UV chamber. Outlet 58 of filter 56 is connected via conduit 60 to inlet 62 of UV chamber 64 which has its outlet 66 connected to solenoid controlled valve 68. A UV light sensor 102 (see FIG. 5) is positioned within watertight sensor port 72 with leads 74 connected to electronic control circuit 28. Faucet 16 is connected to outlet 78 of valve 68 and includes a faucet activator 132 which when depressed allows liquid flow through faucet 16.

Figure 5:
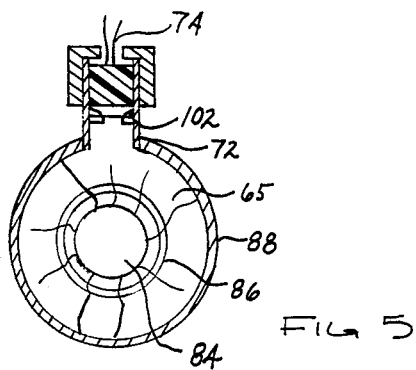
FIG. 5 is a sectional view of the ultraviolet chamber taken from line 4—4 of FIG. 4.
Figure 6:
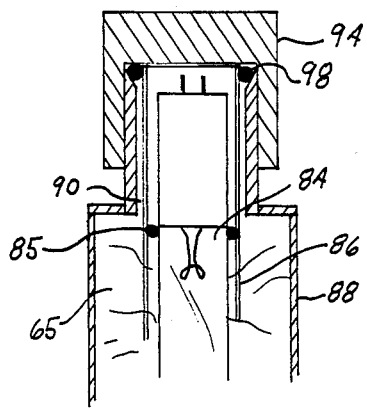
FIG. 6 is a sectional view of the ultraviolet chamber taken from line 6—6 of FIG. 4.

UV chamber 64 shown in detail in FIGS. 5 & 6 includes a UV lamp 84 housed in a quartz sleeve 86 with a rubber O-ring 85 (only one shown) positioned at each end of sleeve 86 between the lamp and sleeve 86 to prevent water from contacting lamp 84. Sleeve 86 is positioned within stainless steel cylinder 88 so as to protrude through end openings 90 and 92 of cylinder 88 (see FIG. 4). Cylinder openings 90 and 92 are sealed by end caps 94 and 96. A rubber O-ring 98 (only on shown) seals the ends of sleeve 86 at end caps 94 and 96. UV chamber 64 has its inlet 62 and outlet 66 in liquid communication with the oversize cylindrical space 65 between sleeve 86 and cylinder 88.

Electronic control 28 (shown in schematic form in FIG. 7) includes UV sensor 102 which is in liquid communication with UV chamber space 65 (see FIG. 5) and is connected to the input of non-inverting amplifier circuit 104. The input of amplifier 104 is connected to comparator circuit 106. The input to comparator circuit 110 is connected to the output of comparator 106, via a current limiting resistor, and to a potentiometer wiper. Comparator 110 is connected to transistors 109 and 111 to drive LED 112. The output of comparator 110 is connected to transistor 126 through limiting resistor 128 to drive solenoid 68. Pump switch 132 is connected between comparator circuit 110 and water pump 32. Faucet switch 130 is connected between solenoid valve 68 and the 12 vdc source. The voltage source for purifier 10 may be either 12 V DC or 110 or 220 VAC. Power regulating circuit 116 includes step down transformer 114 center tapped with half wave rectification supplied by diodes 118, 120, 122 & 124. Circuit 116 provides 12 volts DC to UV lamp 84 and pump 32 when the purifier is supplied with either an AC or DC voltage source.

In operation the user would attach conduit 31 (see FIG. 3) to a water source (not shown) and allow water to flow into filters 38, 40, 56 and UV chamber 64. Initially valve 68 is closed to prevent contaminated water from exiting faucet 16. With voltage for purifier 10 applied from either on AC outlet connected by the included AC power cord (not shown) or a DC source connected to D.C. terminals 134 and 136 located on console 14 (see FIG. 1), the user will place rocker switch 138 into the position corresponding with the voltage source being used, either A.C. or D.C. Power switch 140 is then placed in the on position and the red indicating LED 112 will light to indicate sufficient voltage at lamp 84. A sufficient voltage at lamp 84 will cause it to heat up and begin emitting ultraviolet light. With lamp 84 emitting light, sensor 102 will begin to conduct current causing a voltage to appear at the input of amplifier 104. Amplifier 104 has an initial delay caused by an RC timing network of approximately 30 seconds before outputting a signal to comparator 106. After this initial delay and if lamp 84 is properly functioning at its selected bacterial killing intensity comparator 106 lights LED 108 indicating that decontamination of the existing water in UV chamber 64 is taking place. Typical UV lamps lose 25% of their effective power during the first 100 hours of use; therefore, to prevent bacteria from surviving purifier 10 senses the amount of UV light to ensure an effective kill of bacterium. When sensor 102 detects the required amount of light within chamber 64, comparator 110 will output a voltage to turn off LED 112 and supply a voltage to one side of solenoid 68. If for some reason UV lamp 84 fails to emit sufficient UV light, comparator 110 will fail to supply activating voltage to solenoid 68 which will coose or remain closed thereby preventing any water from being dispensed. When LED 112 is off the user can place a solenoid switch 130 into the on position which will activate and open solenoid controlled valve 68. With valve 68 open, the user can then press pump switch 132 on faucet base 17 to activate pump 32 and supply clear, odorless, safe water to the user. Water pump 32 may be replaced by a gravity or exterior forced flow system in some construction of the invention.

It is understood that the invention is not limited to the above details but may be modified within the scope of the appended claims.

I claim:

1. A water purifier including particulate filtration elements in flow communication with an ultraviolet (UV) power source whereby water flowing into said unit passes through said particulate filters and said UV power source for purification purposes, the improvement wherein a UV power sensor is placed in flow communication with said UV power source for the purpose of sensing the intensity of said UV power within said source, and a decalcification unit in flow communication with said UV power source and constituting means for reducing calcification of said sensor when exposed to said water within said UV power source.

2. The water purifier of claim 1 and timer means for permitting said UV power source to reach its maximum desired power level thereafter exposing water previously within said UV power source for sufficient period of time to purify said water, valve means for permitting fluid flow of said water through said unit after said time delay.

3. The water purification of claim 2 and a receptacle for housing said filtration element, UV power source and decalcification unit to permit operation of said unit with water flow therethrough with said receptacle enclosing said filtration element, UV power source, and decalcification unit.

* * * * *